(12) United States Patent
Maurice et al.

(10) Patent No.: US 11,704,173 B1
(45) Date of Patent: Jul. 18, 2023

(54) STREAMING MACHINE LEARNING PLATFORM

(71) Applicant: Intuit Inc., Mountain View, CA (US)

(72) Inventors: Vigith Maurice, Chicago, IL (US); Amit Kalamkar, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/855,583

(22) Filed: Jun. 30, 2022

(51) Int. Cl.
*G06F 9/54* (2006.01)
*G06N 20/00* (2019.01)

(52) U.S. Cl.
CPC ............ *G06F 9/542* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,516,053 | B1 * | 12/2016 | Muddu | H04L 63/1416 |
| 2009/0006363 | A1 * | 1/2009 | Canny | G06Q 30/02 707/999.005 |
| 2019/0073373 | A1 * | 3/2019 | Surale | H04L 63/083 |
| 2019/0087239 | A1 * | 3/2019 | Adibowo | G06N 20/20 |
| 2019/0228343 | A1 * | 7/2019 | Gu | G06N 20/20 |
| 2019/0303475 | A1 * | 10/2019 | Jindal | G06N 5/003 |
| 2020/0314118 | A1 * | 10/2020 | Levin | H04L 63/1416 |
| 2021/0117868 | A1 * | 4/2021 | Sriharsha | G06F 16/901 |
| 2022/0019935 | A1 * | 1/2022 | Ghatage | G06N 20/00 |
| 2022/0177154 | A1 * | 6/2022 | Stepp | B64D 43/00 |

OTHER PUBLICATIONS

Kubeflow: "The Machine Learning Toolkit for Kubernetes", accessed Jun. 29, 2022 via the Internet (2 pages). https://www.kubeflow.org/.
LFProjects, LLC: MLflow: "An Open Source Platform for the Machine Learning Lifecycle"; accessed Jun. 29, 2022 via the Internet (9 pages). https://mlflow.org/.
The Apache Software Foundation: "Apache Airflow"; accessed Jun. 29, 2022 via the Internet (3 pages). https://airflow.apache.org/.
Spotify/Luigi: "Add Worker Config to Cache Task Completion Results"; accessed Jun. 29, 2022 via the Internet (8 pages). https://github.com/spotify/luigi.

(Continued)

*Primary Examiner* — Charles E Anya
(74) *Attorney, Agent, or Firm* — Ferguson Braswell Fraser Kubasta PC

(57) ABSTRACT

A method implements a streaming machine learning platform. The method includes processing event data with a preprocessing application to generate model input data and cardinality data in response to receiving the event data from a streaming application. The method further includes forwarding, using the cardinality data, the model input data to a machine learning model. The method further includes processing the model input data with the machine learning model to generate model output data stored to an output record. The method further includes processing the model output data from the output record with a post processing application to generate post data stored to a post record. The method further includes generating notification data using the post data of the post record and transmitting a notification of the notification data.

20 Claims, 5 Drawing Sheets

(56) References Cited

OTHER PUBLICATIONS

Prefect Technologies, Inc.: "Say Hello to Prefect 2.0"; accessed Jun. 29, 2022 via the Internet (11 pages). https://www.prefect.io/.
Argo Project: "Get More Done with Kubernetes", accessed Jun. 29, 2022 via the Internet (8 pages). https://argoproj.github.io/.
The Apache Software Foundation: "Apache Flink—Stateful Computations over Data Streams"; accessed Jun. 29, 2022 via the Internet (3 pages). https://flink.apache.org/.
The Apache Software Foundation: "Apache Spark—Unified Engine for Large-scale Data Analytics"; accessed Jun. 29, 2022 via the Internet (9 pages). https://spark.apache.org/.
The Apache Software Foundation: The Unified Apache Beam Model; accessed Jun. 29, 2022 via the Internet (5 pages). https://beam.apache.org/.

* cited by examiner

STREAMING MACHINE LEARNING PLATFORM

BACKGROUND

Traditional machine learning approaches have machine learning models served over a hypertext transfer protocol (HTTP) endpoint hosted as a remote web service. The machine learning model code may be deployed as a container and be hosted by cloud computing platforms. With this approach, there may be a machine learning model for a given input, and the processing may happen within the bounds of an HTTP request (client time outs, static resources, etc.). A challenge is for machine learning models to be deployed and deliver a high throughput operational system that is always on and may be dynamically adjusted based on the input. A further challenge is for computing systems to detect and act upon anomalous events in real time.

SUMMARY

In general, in one or more aspects, the disclosure relates to a method of a streaming machine learning platform. The method includes processing event data with a preprocessing application to generate model input data and cardinality data in response to receiving the event data from a streaming application that received the event data from a source application and stores the event data using an event record corresponding to an event partition of an event topic. The method further includes forwarding, using the cardinality data, the model input data to a machine learning model. The method further includes processing the model input data with the machine learning model to generate model output data stored to an output record corresponding to an output partition of an output topic of the streaming application. The method further includes processing the model output data from the output record with a post processing application to generate post data stored to a post record corresponding to a post partition of a post topic of the streaming application. The method further includes generating notification data using the post data of the post record and transmitting a notification of the notification data.

In general, in one or more aspects, the disclosure relates to a system that implements a streaming machine learning platform. The system includes one or more servers. The system further includes a preprocessing application operating on the one or more servers to process event data to generate model input data. The system further includes a server application operating on the one or more servers to process model input data to generate model output data. The system further includes a post processing application operating on the one or more servers to process the model output data. The preprocessing application is configured for processing the event data to generate the model input data and cardinality data in response to receiving the event data from a streaming application that received the event data from a source application and stores the event data using an event record corresponding to an event partition of an event topic. The server application is configured for forwarding, using the cardinality data, the model input data to a machine learning model. The server application is further configured for processing the model input data with the machine learning model to generate the model output data stored to an output record corresponding to an output partition of an output topic of the streaming application. The post processing application is configured for processing the model output data from the output record to generate post data stored to a post record corresponding to a post partition of a post topic of the streaming application. A publishing application is configured for generating notification data using the post data of the post record. The publishing application is further configured for transmitting a notification of the notification data.

In general, in one or more aspects, the disclosure relates to a method of a streaming machine learning platform. The method further processing event data with a preprocessing application to generate model input data and cardinality data in response to receiving the event data from a streaming application that received the event data from a source application and stores the event data using an event record corresponding to an event partition of an event topic. The method further includes processing the cardinality data to forward the model input data to a machine learning model. The method further includes initiating, by an orchestration application, the machine learning model when a detection application does not detect the machine learning model. The method further includes processing the model input data with the machine learning model to generate model output data stored to an output record corresponding to an output partition of an output topic of the streaming application. The method further includes processing the model output data from the output record with a post processing application to generate post data stored to a post record corresponding to a post partition of a post topic of the streaming application. The method further includes processing the post data of the post record with a publishing application to generate notification data and transmitting a notification of the notification data.

Other aspects of the invention will be apparent from the following description and the appended claims.

DETAILED DESCRIPTION

Figure 1:
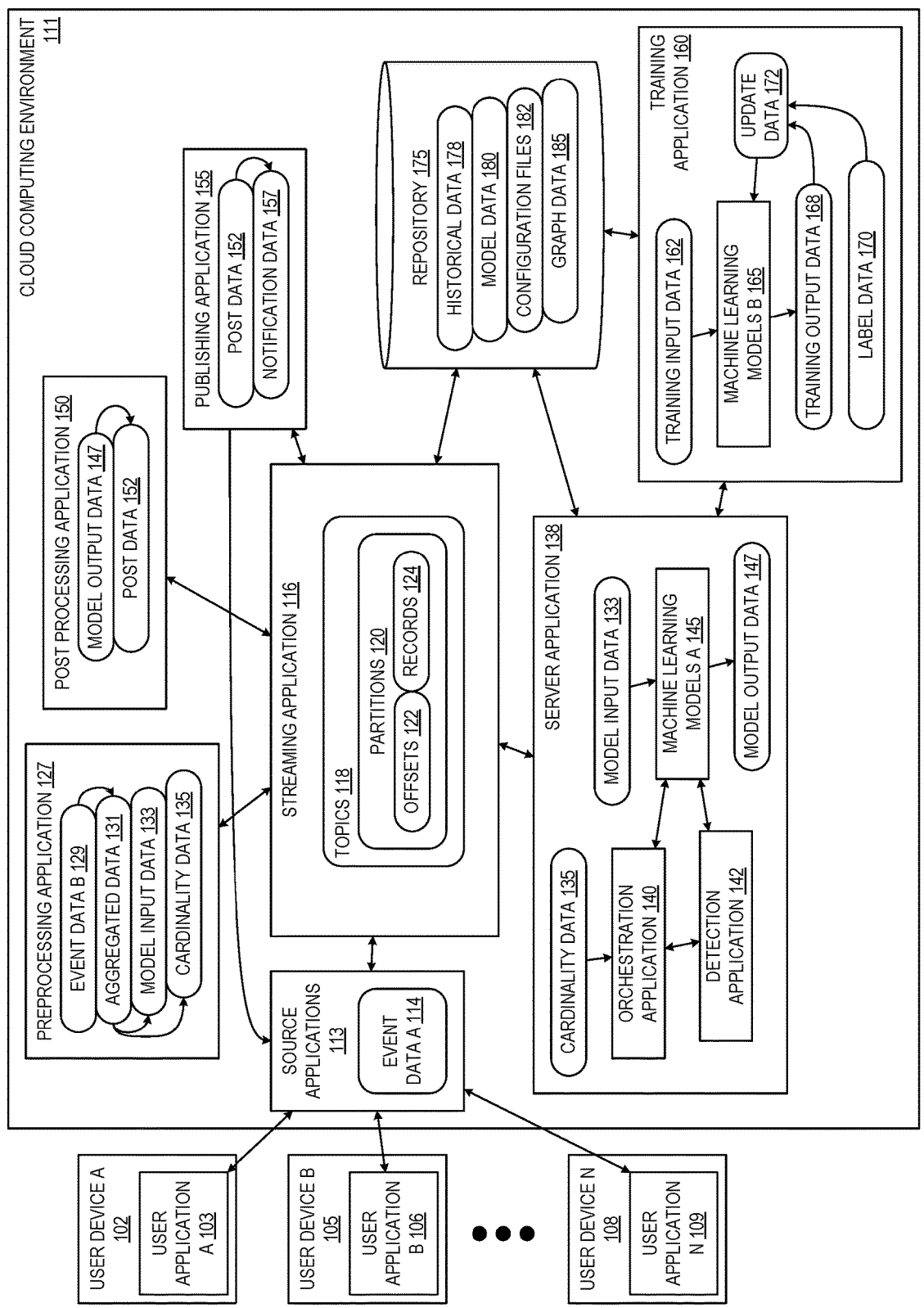
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.)

may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement a streaming machine learning platform. The streaming machine learning platform may be used to detect anomalous events from real time network traffic of systems having millions of concurrent accesses by millions of different users. For example, users (operating user devices) may login to the system and request services. The system handles requests with source applications. The event data generated by the interaction of user applications and source applications is processed using a streaming application. Use of the streamlining application provides for real time analysis of the event data to identify anomalous events and take corresponding action.

Embodiments of the disclosure are different from available workflow systems and stream processing platforms. Workflow systems include task-oriented and generic workflow systems. Task-oriented and generic workflow systems do not use streaming and, rather, use batching or micro-batching. Task-oriented and generic workflow systems do not handle back-pressure propagation and other issues because workflow systems are not meant to do data processing on streaming input. Stream processing platforms are designed for large-scale data processing but not for streaming machine learning models. Stream processing platforms do not have the out-of-the-box capability to do model auto-training if the model has become stale or the model is missing.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of machine learning and data streaming The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements a streaming machine learning platform. The system (100) processes the event data A (114) generated by the interaction of the user applications A (103) and B (106) through N (109) with the source applications (113) to identify and act upon anomalous events. An anomalous event is an event that corresponds to an issue within the system (100). The issues within the system (100) may include errors generated by the components of the system (100), improper access by third parties to the system (100), etc.

The streaming application (116) is a collection of programs that may execute on multiple servers of the cloud computing environment (111). The streaming application (116) receives data from applications that produce data (which may be referred to as producer applications) and provides access to the data for applications that consume the data (which may be referred to as consumer applications). The streaming application (116) stores the data in the topics (118). Each of the topics (118) includes one or more partitions (120). Each of the partitions (120) stores data in pairs of offsets (122) and records (124).

The topics (118) are category names (also referred to as feeds) to which records (including the records (124)) are stored and published. Producer applications (e.g., the source applications (113)) write data to topics and consumer applications (e.g., the publishing application (155)) read from topics. Records published to a topic may stay in the topic until a retention period has expired.

The partitions (120) are subdivisions of one of the topics (118). Each of the partitions (120) contains records (e.g., the records (124)) in an unchangeable sequence within the partition.

The offsets (122) are unique identifiers for the records stored in individual partitions. An offset is a position within a partition for the next record to be sent to a consumer application that consumes the records stored in a partition. In one embodiment, an unsigned integer is used as an offset to maintain the current position of a consumer reading from a partition.

The records (124) are the events, messages, log entries, etc., generated by the system (100). A record may include several fields of data, including a timestamp, server hardware information (internet protocol (IP) address, processing unit information, memory information, operating system information, etc.), server application information (application version, state information, etc.), server error information (error type, error value, etc.), client hardware information (IP address, processing unit information, memory information, operating system information, etc.), client application information (application version, state information, etc.), client error information (error type, error value, etc.), etc. An event from the event data A (114) from one of the source applications (113) may be stored as one of the records (124) paired with one of the offsets (122) in one of the partitions (120) in one of the topics (118).

The preprocessing application (127) is a collection of programs that may execute on multiple servers of the cloud computing environment (111). The preprocessing application (127) processes the event data B (129) to generate the aggregated data (131), the model input data (133), and the cardinality data (135). The preprocessing application (127) processes the event data B (129) to generate the model input data (133) with the dimensions and ranges used by the machine learning models A (145). With respect to the streaming application (116), the preprocessing application (127) consumes (receives from the streaming application (116) using at least one topic, partition, and offset) the event data B (129) and produces (transmits to the streaming application (116) using at least one topic, partition, and offset) one or more of the aggregated data (131), the model input data (133), and the cardinality data (135).

The event data B (129) is a subset of the event data A (114) from one or more of the source applications (113). The event data B (129) is received by the preprocessing application (127) through the streaming application (116).

The aggregated data (131) is an aggregation of the event data B (129). The aggregated data (131) may include counts, sums, averages, etc., derived from multiple events from the event data B (129). For example, the aggregated data may include a record that identifies the average of a value of a field from a record from the event data B (129).

The model input data (133) is data that has been formatted for input to the machine learning models A (145). The model input data (133) is generated by processing the event data B (129) and may include normalizing values.

The cardinality data (135) is data that describes the cardinality of the model input data (133). When the cardinality data (135) indicates a high level of cardinality, the data for the model input data (133) may be sparse. Different ones of the machine learning models A (145) may be used based on the amount of cardinality and a cardinality threshold.

The server application (138) is a collection of programs that may execute on multiple servers of the cloud computing environment (111). The server application (138) processes the model input data (133) to generate the model output data (147) using the cardinality data (135), the orchestration application (140), the detection application (142), and the machine learning models A (145). With respect to the streaming application (116), the server application (138) consumes (receives from the streaming application (116) using at least one topic, partition, and offset) the cardinality data (135) and the model input data (133). The server application (138) produces (transmits to the streaming application (116) using at least one topic, partition, and offset) one or more of the aggregated data (131), the model input data (133), and the cardinality data (135).

The cardinality data (135) was generated by the preprocessing application (127) for the model input data (133). The cardinality data (135) describes the cardinality (i.e., the sparseness) of the event data B (129) and the model input data (133). The cardinality data (135) is input to the orchestration application (140).

The orchestration application (140) is a program of the server application (138). The orchestration application (140) orchestrates the loading and training of the machine learning models A (145) to process the model input data (133). For the model input data (133), the orchestration application (140) identifies the machine learning models A (145) that are used to process the model input data (133). The orchestration application (140) uses the detection application to determine if the appropriate machine learning models A (145) are loaded and ready to process the model input data (133). Additionally, the orchestration application determines when the machine learning models A (145) are to be retrained. The orchestration application (140) may use runtime automatic model selection to route an inference payload based on the decision engine logic residing at each edge. For example, one of the configuration files (182) may provide the decision engine logic used by the orchestration application (140) to identify the correspondence between the model input data (133) and one or more of the machine learning models A (145) and to instantiate one or more of the machine learning models A (145) at runtime.

The detection application (142) is a program of the server application (138). The detection application (142) detects whether the machine learning models A (145) have been loaded and are ready to process the model input data (133).

The model input data (133) is data generated from the event data B (129) by the preprocessing application (127). The model input data (133) is input to the machine learning models A (145).

The machine learning models A (145) are programs used by the server application (138). The machine learning models may use algorithms that include naïve Bayes classifier algorithms, clustering algorithms, support vector machine algorithms, linear regression algorithms, logistic regression algorithms, artificial neural network algorithms, decision tree algorithms, random forest algorithms, nearest neighbor algorithms, etc. The machine learning models A (145) process the model input data (133) to generate the model output data (147). The parameters for the machine learning models A (145) are stored in the model data (180) in the repository (175).

The model output data (147) is the output from the machine learning models A (145). The dimensionality and ranges of the model output data (147) may be different from the dimensionality and ranges of the model input data (133).

The post processing application (150) is a collection of programs that may execute on multiple servers of the cloud computing environment (111). The post processing application (150) processes the model output data (147) to generate the post data (152). With respect to the streaming application (116), the post processing application (150) consumes (receives from the streaming application (116) using at least one topic, partition, and offset) the model output data (147) and produces (transmits to the streaming application (116) using at least one topic, partition, and offset) the post data (152).

The model output data (147) is the output from the machine learning models A (145) generated in response to the model input data (133). The model output data (147) is received by the post processing application (150) through the streaming application (116).

The post data (152) is a post processed version of the model output data (147) generated from the model input data (133), which was generated from the event data B (129). The post data (152) may have dimensions and ranges that are different from the dimensions and ranges of the model output data (147).

The publishing application (155) is a collection of programs that may execute on multiple servers of the cloud computing environment (111). The publishing application (155) processes the post data (152) to generate the notification data (157). With respect to the streaming application (116), the publishing application (155) consumes (receives from the streaming application (116) using at least one topic, partition, and offset) the post data (152). The publishing application transmits the notification data to the source applications (113).

The post data (152) was generated by the post processing application (150). The post data (152) is processed to generate the notification data (157).

The notification data (157) includes notifications that are transmitted to the source applications (113). For example, a notification may indicate that a login request from the event data A (114) was denied after processing the event data A (114) by the system (100).

The source applications (113) are programs that may execute on multiple servers of the cloud computing environment (111). The source applications (113) interact with the user devices A (102) and B (105) through N (108) and generate the event data A (114). The source applications (113) may include login applications and applications that provide additional services to the users operating the user devices A (102) and B (105) through N (108). For example, the source applications (113) may include financial management applications and tax applications. The financial management applications may manage the financial accounts of users of the user devices A (102) and B (105) through N (108). The tax applications may prepare tax forms for the users of the user devices A (102) and B (105) through N (108).

The training application (160) is a collection of programs that may execute on multiple servers of the cloud computing environment (111). The training application (160) trains the machine learning models B (165). The training may be performed periodically or in response to a trigger. In one embodiment, the orchestration application (140) may invoke the training application (160) to train one or more of the machine learning models A (145) for processing the model input data (133). The training application (160) trains the machine learning models B (165) using the training input data (162), the training output data (168), the label data (170), and the update data (172).

The training input data (162) is a subset of the historical data (178) from the repository (175). The training input data (162) may include historical records from the streaming application (116). The training input data (162) is the input used to train the machine learning models B (165).

The machine learning models B (165) are the models being trained by the training application (160). The machine learning models B (165) may be a subset of the machine learning models A (145) used by the server application (138). The machine learning models B (165) process the training input data (162) to generate the training output data (168).

The training output data (168) is the output from the machine learning models B (165). The training output data (168) may have the same dimensions and ranges as the model output data (147).

The label data (170) are labels for the training input data (162). The label data (170) may be retrieved in the historical data (178) of the repository (175) for supervised learning or be generated during training for unsupervised learning. The label data (170) identifies the expected outputs from the machine learning models B (165), which are used to generate the update data (172).

The update data (172) includes the updates to the machine learning models B (165). The update data (172) may be generated by the training application by comparing the training output data (168) with the label data (170). The update data (172) may be generated using backpropagation and gradient descent.

The repository (175) is a computing system that may include multiple computing devices in accordance with the computing system (400) and the nodes (422) and (424) described below in FIGS. 4A and 4B. The repository (175) is hosted by the cloud computing environment (111) by a cloud services provider. The cloud services provider may provide hosting, virtualization, and data storage services as well as other cloud services and to operate and control the data, programs, and applications that store and retrieve data from the repository (175). The data in the repository (175) includes the historical data (178) the model data (180), the configuration files (182), the graph data (185), etc.

The historical data (178) is data generated by the system (100) that may be used for later analysis. The historical data (178) may include the records (124) from the streaming application (116), the training input data (162), and the label data (170).

The model data (180) is the data that includes the definitions and instances of the machine learning models A (145) and B (165). The model data (180) is updated by the training application (160).

The configuration files (182) are files that define the data and transformations to the data used by the system to analyze the event data A (114) and generate the notification data (157). The configuration files (182) define the processes of the preprocessing application (127), the server application (138), the machine learning models A (145), the post processing application (150), and the publishing application (155). Different files of the configuration files (182) may be written using different languages. For example, the preprocessing application (127) may have components written using Java, the machine learning models A (145) may have components written using Python, and the postprocessing application (150) may have components written using Golang. Other languages may be used.

The graph data (185) defines the data and transformations of the system (100) using graphs. In one embodiment, the data used by the system (100) (including the event data A (114), the model input data (133), the model output data (147), and the post data (152)) are defined as vertices of a graph and the transformations used to process the data are defined as edges of the graph. The graph data (185) may be exposed through an application programming interface (API) of a graph database and accessed using a graph query language.

The cloud computing environment (111) is a collection of computing systems (further described in FIG. 4A) that include hardware and software components to deploy the applications used by the system (100). The applications deployed with the cloud computing environment (111) include the source applications (113), the streaming application (116), the preprocessing application (127), the server application (138), the post processing application (150), the publishing application (155), and the training application (160). The repository (175) may further be deployed using the cloud computing environment (111).

Figure 4A:
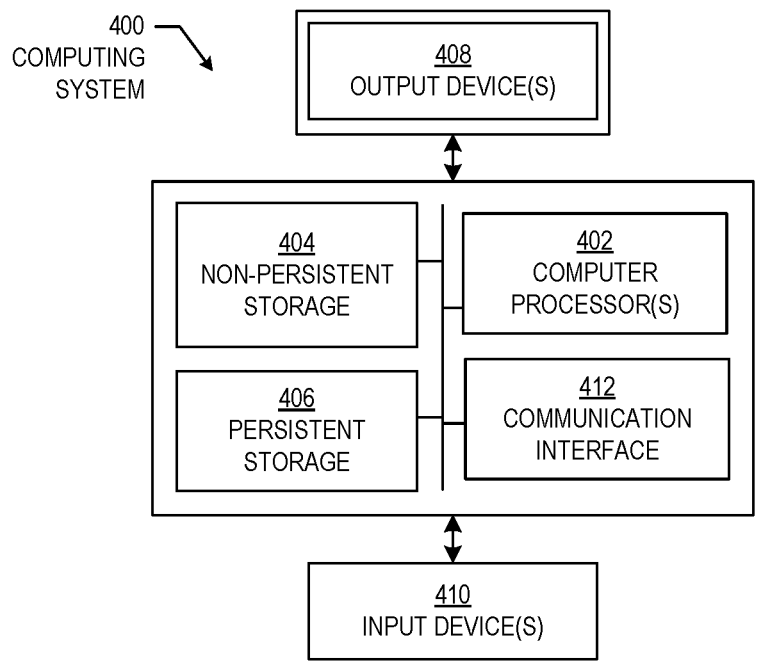
FIG. 4A and FIG. 4B show computing systems in accordance with disclosed embodiments.

The user devices A (102) and B (105) through N (108) are computing systems (further described in FIG. 4A). For example, the user devices A (102) and B (105) through N (108) may be desktop computers, mobile devices, laptop computers, tablet computers, server computers, etc. The user devices A (102) and B (105) through N (108) include hardware components and software components that operate as part of the system (100). The user devices A (102) and B (105) through N (108) communicate with the servers of the cloud computing environment (111), to access, manipulate, and view information, including the information. The user devices A (102) and B (105) through N (108) may communicate with the servers using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (105) through N (108) respectively include the user applications A (103) and B (106) through N (109).

The user applications A (103) and B (106) through N (109) may each include multiple programs respectively running on the user devices A (102) and B (105) through N (108). The user applications A (103) and B (106) through N (109) may be native applications, web applications, embedded applications, etc. In one embodiment, the user applications A (103) and B (106) through N (109) include web browser programs that display web pages from the source applications (113). In one embodiment, the user applications A (103) and B (106) through N (109) provide graphical user interfaces that may display the notification data (157).

As an example, the user application A (103) may be used by a user to login to the system (100) and access services provided by the system (100). The requests generated by the user application A (103) may be analyzed by the server application (138) to identify anomalous events. When an event for a request is identified as anomalous, a notification (which may include information from the notification data (157)) may be displayed by the user application A (103).

As another example, the user device N (109) may be used by a developer to maintain the configuration files (182) and machine learning models A (145). Developers edit the configuration files to change the operation of the preprocessing application (127), the server application (138), the machine learning models A (145), the post processing application (150), and the publishing application (155) to correct errors or modify the applications served to the users of the system (100).

Although shown using distributed computing architectures and systems, other architectures and systems may be used. In one embodiment, the applications hosted by the cloud computing environment (111) may be part of a monolithic application that implements the system (100). In one embodiment, the user applications A (103) and B (106) through N (109) may also include or be part of monolithic applications that implement the system (100).

Figure 2:
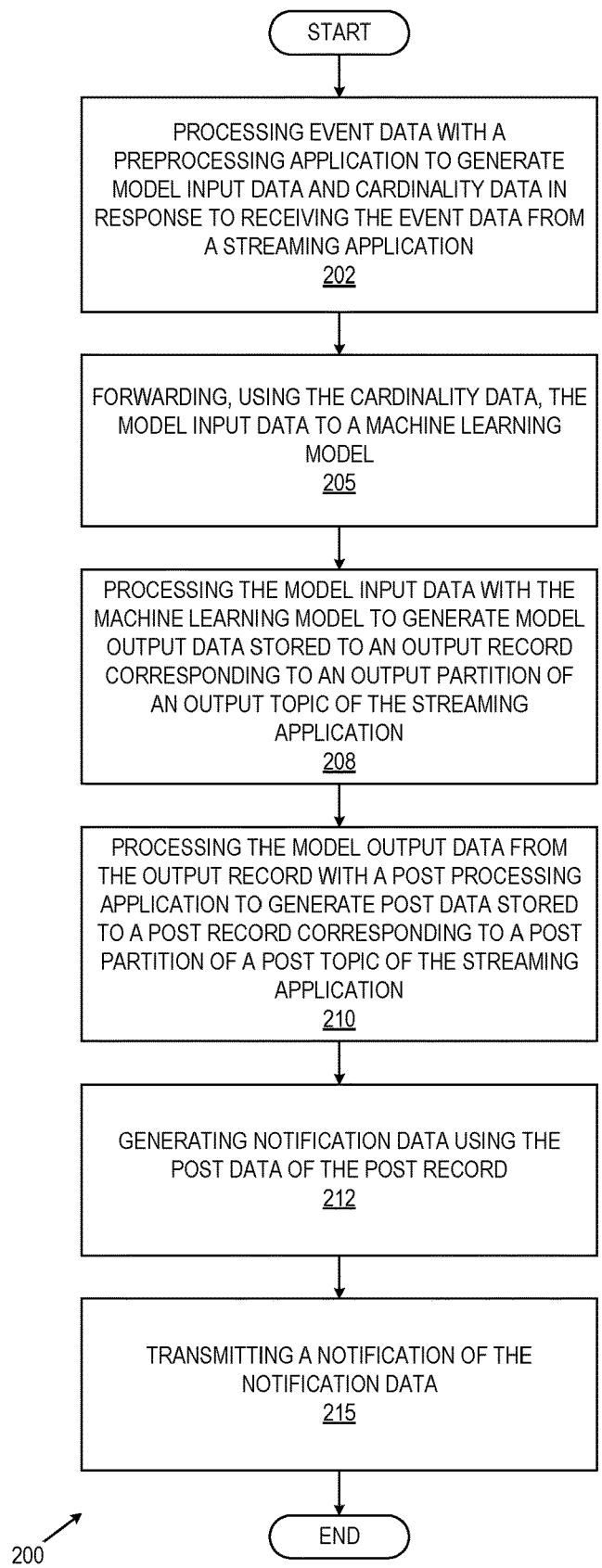
FIG. 2 shows a flowchart in accordance with disclosed embodiments.

Turning to FIG. 2, the process (200) implements a streaming machine learning platform. The process (200) may be performed by a server computing system.

At Step 202, event data is processed, with, e.g., a preprocessing application, to generate model input data and cardinality data in response to receiving the event data from a streaming application. The streaming application received the event data from a source application and stores the event data using an event record corresponding to an event partition of an event topic.

In one embodiment, the streaming application may facilitate the transmission of the event data from a source application (that is a producer of the event data) to the preprocessing application (that is a consumer of the event data). The event data is stored to an event record of an event topic and an event partition maintained by the streaming application. The event data is then retrieved from the event record using the event topic, the event partition, and an event offset. The event offset may be a numerical value and different consumer applications may use different event offsets for the same record. The aggregated data generated by the preprocessing application may be stored to an aggregated partition of an aggregated topic and retrieved using an aggregated offset, the aggregated partition, and the aggregated topic. The model input data generated by the preprocessing application may be stored as a model input record to a model input partition of a model input topic and retrieved using a model input offset, the model input partition, and the model input topic. Different consumer applications may use different model input offsets for the same model input record.

In one embodiment, the event data is processed to generate aggregated data, which may be processed to generate the model input data. The aggregated data may aggregate multiple events into a single record. The system may identify the events that occurred during a time window (five minutes, ten minutes, an hour, etc.) and generate a record from the events that aggregates the values of a field from the events. For example, a field may specify an error that occurred (e.g., bad password) and the system aggregates the events with the error into a single record that provides a count of the number of times the error occurred during the time window. The aggregation may provide a count, a sum, an average, etc.

In one embodiment, the event data may include a categorical variable that is converted into dummy variables for the model input data. For example, a categorical variable may have three possible values in the event data, which is converted into three dummy variables (one for each possible value) having binary values.

In one embodiment, transformations and normalizations may be applied to the event data to generate the model input data. For example, the range of values of a field from the event data may be scaled to be from zero to one. As another example, the values of a field from the event data may be normalized by subtracting the average value and dividing by the value of the standard deviation. Additional transformations and normalizations may be used, including affine transformations.

At Step 205, the cardinality data is processed to forward the model input data to a machine learning model. The cardinality data may be processed using a cardinality threshold. For example, when a cardinality value satisfies (e.g., exceeds) the cardinality threshold (e.g., "5"), the model input data may be sent to and processed by a machine learning model for model input data having high cardinality. When the cardinality threshold is not met, the model input data may be sent to and processed by a different machine learning model for model input data having low cardinality.

At Step 208, the model input data is processed with the machine learning model to generate model output data. The model output data is stored to an output record corresponding to an output partition of an output topic of the streaming application.

In one embodiment, the machine learning model may be multiple layers and use multiple machine learning algorithms For example, the machine learning model may be an artificial neural network that includes embedding layers, recurrent layers, fully connected layers, attention layers, etc.

At Step 210, the model output data from the output record is processed, with, for example, a post processing application. The post processing application may generate post data stored to a post record corresponding to a post partition of a post topic of the streaming application.

In one embodiment, the post processing application may adjust the dimensions and ranges of the values of the model output data. For example, the post processing application may convert dummy variables to a categorical variable. Additionally, an output value that ranges from zero to 1 may be transformed to scale within a different range (e.g., from 1 to 10).

At Step 212, the post data of the post record is processed, with, for example, a publishing application. The publishing application may generate notification data from the post record. For example, a value from a post record may identify that a request (e.g., a login request) should be denied. The publishing application may generate a notification that includes a text string to indicate that the request is denied.

At Step 215, a notification of the notification data is transmitted. The notification may be transmitted to a server application that transmits the notification to a user device that displays the notification.

In one embodiment, the notification triggers an action that is performed. Types of actions may include restarting a server application, restarting a server, terminating a server, flagging a user, banning the user, flagging a user device, banning a user device, resetting a user session, etc.

In one embodiment, the cardinality data is processed, with, for example, an orchestration application. The orchestration application may use a detection application to detect if the machine learning model for the model input data is ready to process the model input data. The detection application may send a message to the machine learning model. If an error is returned, the machine learning model may not be ready, and the orchestration application may instantiate or train a new instance of the machine learning model. In one embodiment, the orchestration application may instantiate the machine learning model when the detection application does not detect the machine learning model. In one embodiment, a new service or event source may be onboarded to the system that produces a new type of input data for which a new type of machine learning model may be used. In response to the first time receiving the new input data, the orchestration application may gracefully handle the training and instantiation of the new machine learning model to handle the input data. For example, the orchestration application may identify a configuration file that defines the new type of input data and specifies the new type of machine learning model, which the orchestration application may then instantiate and train.

In one embodiment, a training application may train the machine learning model. The training may use historical data saved from the streaming application.

In one embodiment, a training application may train the machine learning model in response to an orchestration application. The orchestration application may trigger the training based on a configuration file. For example, the configuration file may specify a period of time (one day, seven days, thirty days, etc.) that, when expired, causes the orchestration application to train the machine learning model. The machine learning model may be trained using the most recent historical data captured by the system that was not previously used to train the machine learning model.

In one embodiment, the preprocessing application, the server application, the post processing application, and the training application are initiated with a set of configuration files. The server application may include an orchestration application, a detection application, and the machine learning model. The configuration files may specify the types of transformations performed to the data by the preprocessing application, the server application, and the post processing application. The transformations include the application of algorithms to the data, including the algorithms utilized by the machine learning models.

In one embodiment, the preprocessing application, the machine learning model, and the post processing application are implemented using a directed acyclic graph stored as graph data. The applications may be deployed as components that correspond vertices and edges of the directed acyclic graph. The logic used by the system may represent the transformations of the data through the system and be represented using graph terminology (vertices and edges) with runtime decisions forming attributes of edges of the graph.

In one embodiment, one or more of the event topic, an input topic, the output topic, and the post topic are the same topic. One or more of the event partitions (for event data), the input partition (for model input data), the output partition (for model output data), and the post partition (for post data) are the same partition. One or more of the event record, an input record, the output record, and the post record are the same record.

Figure 3A:
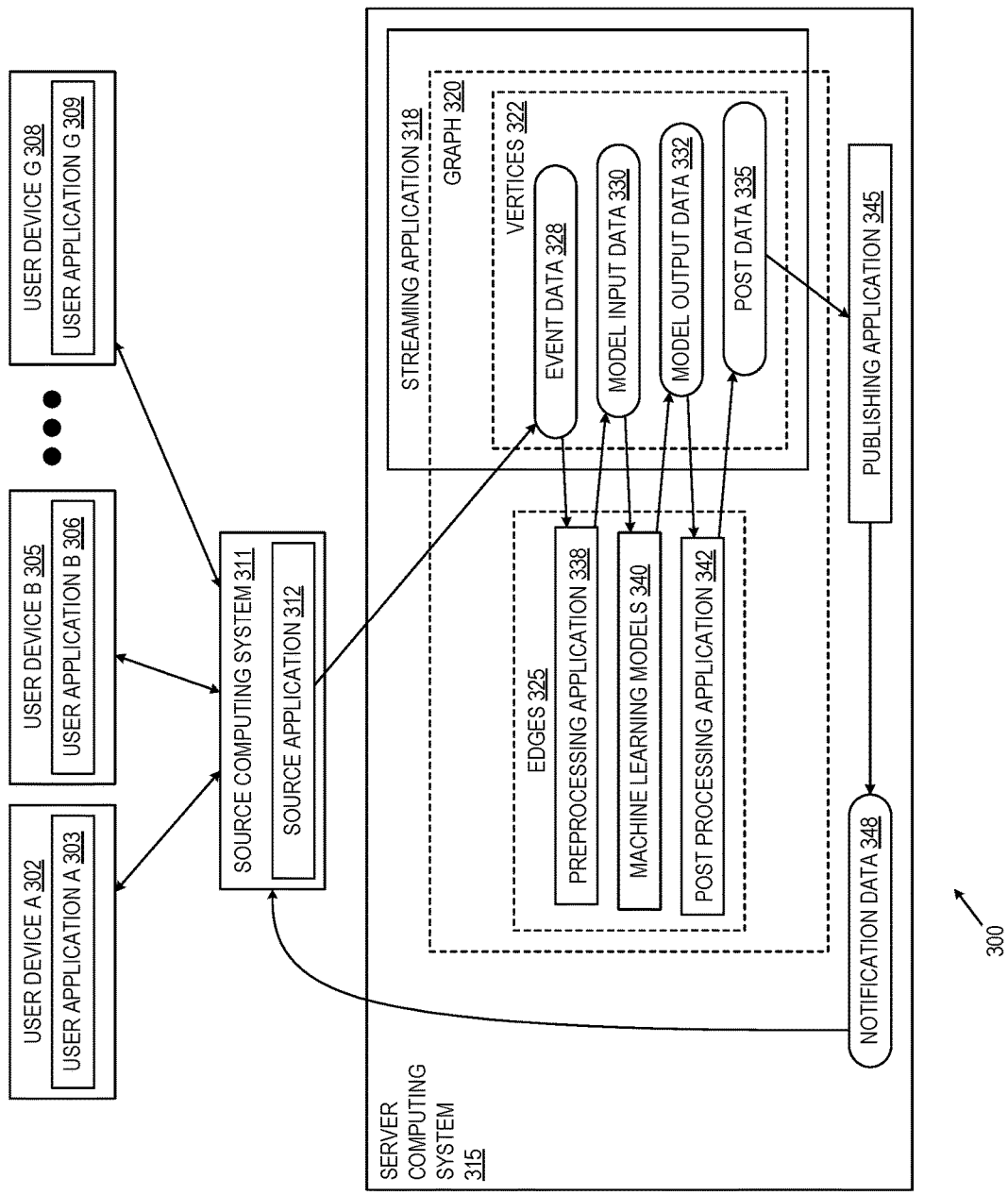
FIG. 3A, FIG. 3B, and FIG. 3C show examples in accordance with disclosed embodiments.

Turning to FIG. 3A, the system (300) uses a streaming machine learning platform to process events. One or more of the user devices A (302) and B (305) through G (308), the source computing system (311), and the server computing system (315) may operate as part of a cloud environment. One or more of the user devices A (302) and B (305) through G (308) may be independent devices, e.g., a smartphone. The source computing system (311) and the server computing system (315) may each include multiple computing systems that host multiple applications.

A user of the user device A (302) is attempting to login and access the services provided by the source application (312) of the source computing system (311). The user device A (302) is one of many user devices (e.g., thousands to millions of user devices) including the user devices A (302) and B (305) through G (308) accessing the source application (312).

The events generated by the interaction of the user devices A (302) and B (305) through G (308) with the source computing system (311) are stored as the event data (328) by the streaming application (318). The streaming application (318) also stores the model input data (330), the model output data (332), and the post data (335). The data of the streamlining application correspond to the vertices (322) of the graph (320) and may be stored as records of partitions of topics of the streaming application. The graph (320) exposes the data in the vertices through an application programming interface of a graph database. The edges (325) of the graph (320) include the preprocessing application (338), the machine learning models (340), and the post processing application (342).

A login event from the user application A (303) to the source application (312) is stored to the event data (328) on the server computing system (315). The event data (328) is received by the preprocessing application (338).

The preprocessing application (338) processes the event data (328) to generate the model input data (330). For example, the preprocessing application (338) may convert a categorical variable from the event data (328) to dummy variables in the model input data (330). The model input data (330) is stored to the streaming application (318) and transmitted to the machine learning models (340).

The machine learning models (340) process the model input data (330) to generate the model output data (332). In one embodiment, the machine learning models (340) are selected by an orchestration application based on the model input data (330) and on the cardinality of the model input data (330). The machine learning models (340) apply trained instances of machine learning model algorithms to the model input data (330) to generate the model output data (332). The model output data (332) is stored to the streaming application (318) and transmitted to the post processing application (342).

The post processing application (342) processes the model output data to generate the post data (335). The post processing application (342) applies one or more transformations to the model output data (332) to generate the post data (335). For example, the post processing application (342) may rescale a variable from the model output data (332) from a continuous range of zero to 1 to a discreet range of 1 to 10 by adding an offset, multiplying the offset values by 9, and rounding the multiplied values. The post data (335) is stored to the streaming application (318) and transmitted to the publishing application (345).

The publishing application (345) processes the post data (335) to generate the notification data (348). The notification data (348) includes notifications for one or more of the source application (312) and the user devices A (302) and B (305) through G (308). Notification data (348) is transmitted to the source application (312) and may be transmitted to the user applications A (303) and B (306) through G (309).

In response to the login request from the user device A (302), the notification data (348) includes a denial of the login request that is transmitted to the source application (312). The source application (312) transmits the notification to the user application A (303). The user application A (303) displays the notification through the user device A (302) to the user to indicate that the login request was denied.

Figure 3B:
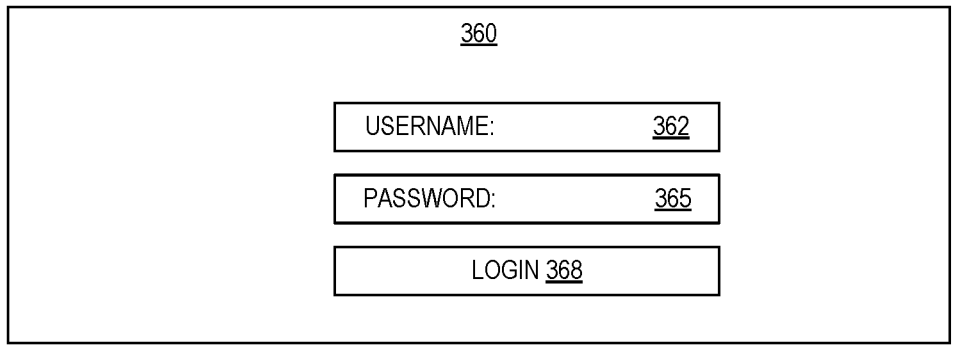

Turning to FIG. 3B, the login page (360) is displayed by the user device A (302) (of FIG. 3A). The user inputs a username to the username field (362) and a password to the password field (365) and then clicks on the login button (368). In response to clicking the login button (368), an event is generated that is processed by the system (300) of FIG. 3A.

Figure 3C:
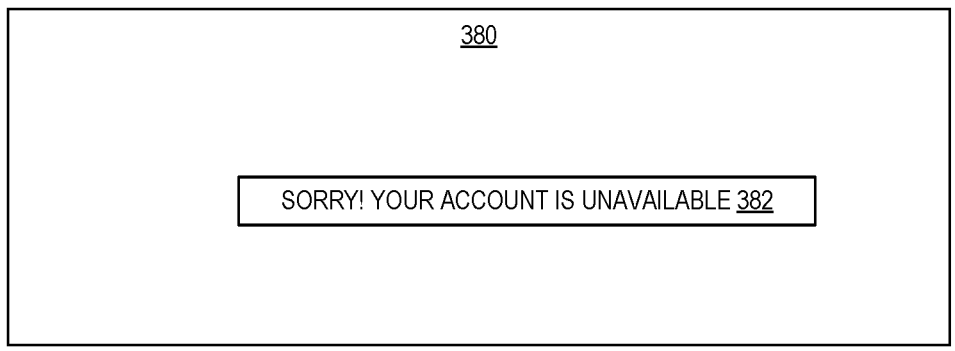

Turning to FIG. 3C, the response page (380) is displayed by the user device A (302) (of FIG. 3A). After being processed with the preprocessing application (338), the machine learning models (340), and the post processing application (342) of FIG. 3A, a notification is generated to indicate that the login request was denied. The response page (380) includes the text (382) based on the notification and indicates to the user that the account may not be accessed.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
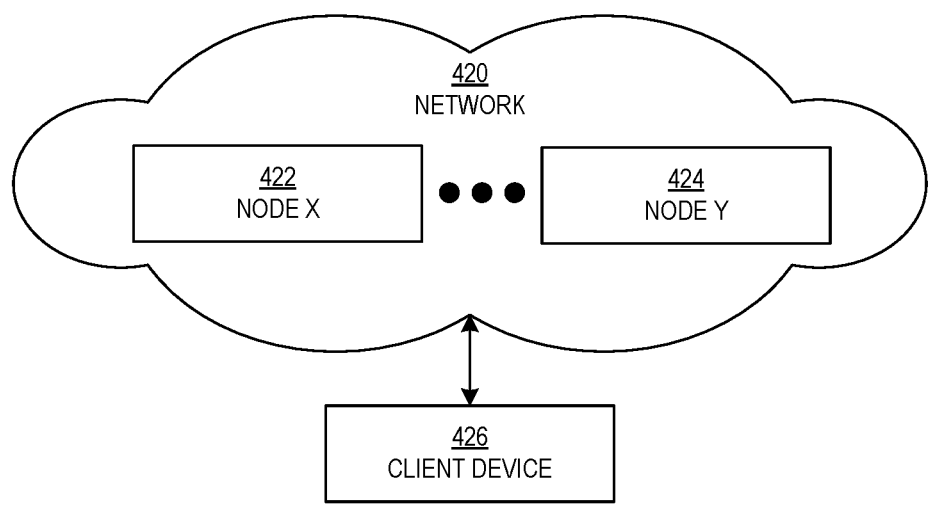

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether $A>B$, $A=B$, $A \mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A-B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the

DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method comprising:
processing event data with a preprocessing application to generate model input data and cardinality data of the model input data, wherein the model input data and cardinality data are generated in response to receiving the event data from a streaming application that received the event data from a source application and stores the event data using an event record corresponding to an event partition of an event topic;
forwarding, using the cardinality data of the model input data, the model input data to a machine learning model, wherein the cardinality data is processed using a cardinality threshold and wherein when the cardinality threshold is not met, the model input data are sent to and processed by a different machine learning model for model input data having low cardinality;
processing the model input data with the machine learning model to generate model output data stored to an output record corresponding to an output partition of an output topic of the streaming application;
processing the model output data from the output record with a post processing application to generate post data stored to a post record corresponding to a post partition of a post topic of the streaming application;
generating notification data using the post data of the post record; and
transmitting a notification of the notification data.
2. The method of claim 1, further comprising:
transmitting the notification, wherein the notification triggers an action comprising at least one of restarting a server application, restarting a server, terminating the server, flagging a user, banning the user, flagging a user device, banning the user device, and resetting a user session.
3. The method of claim 1, further comprising:
processing the event data with the preprocessing application to generate the model input data stored to an input record corresponding to an input partition of an input topic of the streaming application.
4. The method of claim 1, further comprising:
processing the cardinality data with an orchestration application to detect the machine learning model with a detection application.
5. The method of claim 1, further comprising:
initiating, by an orchestration application, the machine learning model when a detection application does not detect the machine learning model.
6. The method of claim 1, further comprising:
training, with a training application, the machine learning model using historical data saved from the streaming application.
7. The method of claim 1, further comprising:
training, with a training application, the machine learning model in response to an orchestration application triggering the training based on a configuration file.

8. The method of claim 1, further comprising:
initiating the preprocessing application, a server application, the post processing application, and a training application with a set of configuration files, wherein the server application comprises an orchestration application, a detection application, and the machine learning model; and
implementing the preprocessing application, the machine learning model, and the post processing application with graph data comprising a directed acyclic graph.

9. The method of claim 1, wherein one or more of the event topic, an input topic, the output topic, and the post topic are a same topic.

10. The method of claim 1, wherein one or more of the event partition, an input partition, the output partition, and the post partition are a same partition.

11. A system comprising:
one or more processors of one or more servers;
a preprocessing application operating on the one or more processors of the one or more servers to process event data to generate model input data;
a server application operating on the one or more processors of the one or more servers to process model input data to generate model output data;
a post processing application operating on the one or more processors of the one or more servers to process the model output data;
the preprocessing application configured for processing the event data to generate the model input data and cardinality data of the model input data, wherein the model input data and cardinality data are generated in response to receiving the event data from a streaming application that received the event data from a source application and stores the event data using an event record corresponding to an event partition of an event topic;
the server application configured for forwarding, using the cardinality data of the model input data, the model input data to a machine learning model, wherein the cardinality data is processed using a cardinality threshold and wherein when the cardinality threshold is not met, the model input data are sent to and processed by a different machine learning model for model input data having low cardinality;
the server application configured for processing the model input data with the machine learning model to generate the model output data stored to an output record corresponding to an output partition of an output topic of the streaming application;
the post processing application configured for processing the model output data from the output record to generate post data stored to a post record corresponding to a post partition of a post topic of the streaming application;
a publishing application configured for generating notification data using the post data of the post record; and
the publishing application further configured for transmitting a notification of the notification data.

12. The system of claim 11,
wherein the publishing application is further configured for transmitting the notification, and
wherein the notification triggers an action comprising at least one of restarting an application, restarting a server, terminating the server, flagging a user, banning the user, flagging a user device, banning the user device, and resetting a user session.

13. The system of claim 11, wherein the preprocessing application is further configured for processing the event data to generate the model input data stored to an input record corresponding to an input partition of an input topic of the streaming application.

14. The system of claim 11, further comprising:
an orchestration application configured for processing the cardinality data to detect the machine learning model with a detection application.

15. The system of claim 11, further comprising:
an orchestration application configured for initiating the machine learning model when a detection application does not detect the machine learning model.

16. The system of claim 11, further comprising:
a training application configured for training the machine learning model using historical data saved from the streaming application.

17. The system of claim 11, further comprising:
a training application configured for training the machine learning model in response to an orchestration application triggering the training based on a configuration file.

18. The system of claim 11, further comprising the system configured for:
initiating the preprocessing application, the server application, the post processing application, and a training application with a set of configuration files, wherein the server application comprises an orchestration application, a detection application, and the machine learning model; and
implementing the preprocessing application, the machine learning model, and the post processing application with graph data comprising a directed acyclic graph.

19. The system of claim 11, wherein one or more of the event topic, an input topic, the output topic, and the post topic are a same topic.

20. A method comprising:
processing event data with a preprocessing application to generate model input data and cardinality data of the model input data, wherein the model input data and cardinality data are generated in response to receiving the event data from a streaming application that received the event data from a source application and stores the event data using an event record corresponding to an event partition of an event topic;
processing the cardinality data of the model input data to forward the model input data to a machine learning model, wherein the cardinality data is processed using a cardinality threshold and wherein when the cardinality threshold is not met, the model input data are sent to and processed by a different machine learning model for model input data having low cardinality;
initiating, by an orchestration application, the machine learning model when a detection application does not detect the machine learning model;
processing the model input data with the machine learning model to generate model output data stored to an output record corresponding to an output partition of an output topic of the streaming application;
processing the model output data from the output record with a post processing application to generate post data stored to a post record corresponding to a post partition of a post topic of the streaming application;
processing the post data of the post record with a publishing application to generate notification data; and
transmitting a notification of the notification data.

* * * * *